US012637150B2

(12) United States Patent
Brown

(10) Patent No.: US 12,637,150 B2
(45) Date of Patent: May 26, 2026

(54) CAB ASSEMBLY FOR FACILITATING INSTALLATION OF A STEERING COLUMN ON AN ORIGINAL PASSENGER SIDE OF A TRUCK CAB

(71) Applicant: Fontaine Modification Company, Charlotte, NC (US)

(72) Inventor: Garrett Brown, Mount Holly, NC (US)

(73) Assignee: Fontaine Modification Company, Charlotte, NC (US)

( * ) Notice: Subject to any disclaimer, the term of this patent is extended or adjusted under 35 U.S.C. 154(b) by 0 days.

(21) Appl. No.: 19/085,399

(22) Filed: Mar. 20, 2025

(65) Prior Publication Data

US 2025/0296641 A1 Sep. 25, 2025

Related U.S. Application Data

(60) Provisional application No. 63/569,692, filed on Mar. 25, 2024.

(51) Int. Cl.
*B62D 33/06* (2006.01)
*B62D 1/22* (2006.01)
*B62D 25/14* (2006.01)

(52) U.S. Cl.
CPC .............. *B62D 33/06* (2013.01); *B62D 1/22* (2013.01); *B62D 25/14* (2013.01)

(58) Field of Classification Search
CPC ........... B62D 33/06; B62D 1/22; B62D 25/14
See application file for complete search history.

(56) References Cited

U.S. PATENT DOCUMENTS

| | | | | |
|---|---|---|---|---|
| 4,601,510 | A | 7/1986 | Roman | |
| 5,707,100 | A * | 1/1998 | Suyama | B60H 1/0055 |
| | | | | 296/192 |
| 5,857,726 | A | 1/1999 | Yokoyama | |
| 5,863,093 | A | 1/1999 | Novoa | |
| 5,989,302 | A | 11/1999 | Krowech | |
| 6,260,914 | B1 | 7/2001 | Nieminski | |
| 6,371,551 | B1 | 4/2002 | Hedderly | |
| 6,851,742 | B1 | 2/2005 | Kubiak | |
| 7,044,538 | B2 * | 5/2006 | Stack | B60H 1/0055 |
| | | | | 296/70 |

(Continued)

FOREIGN PATENT DOCUMENTS

| | | |
|---|---|---|
| CA | 2373779 A1 | 11/2000 |
| CA | 2297703 A1 | 7/2001 |

(Continued)

*Primary Examiner* — Faye M Fleming
(74) *Attorney, Agent, or Firm* — Andrus Intellectual Property Law, LLP

(57) ABSTRACT

A cab assembly facilitating installation of a steering column on an original passenger side of a truck cab includes a dash assembly having a first section having a steering column opening configured to be located on the original passenger side of the truck cab and a second section configured to be located on an original driver side of the truck cab to cover a HVAC assembly, and a console bracket configured to support an original module of the truck cab thereon that is relocated from the original passenger side or the original driver side of the truck cab, the console bracket is positioned between a footwell on the original driver side of the truck cab and a footwell on the original passenger side of the truck cab.

21 Claims, 11 Drawing Sheets

(56)                         References Cited

U.S. PATENT DOCUMENTS

| | | | | |
|---|---|---|---|---|
| 7,370,719 | B2 | 5/2008 | Sakamoto | |
| 8,100,463 | B2 | 1/2012 | Penner | |
| 8,945,285 | B2 | 2/2015 | Spryshak | |
| 10,457,333 | B1 | 10/2019 | Allen | |
| 11,827,269 | B2 * | 11/2023 | Ahn | B60K 35/60 |
| 11,912,342 | B2 * | 2/2024 | Peksa | B62D 1/16 |
| 12,024,857 | B2 * | 7/2024 | Das | E02F 9/163 |
| 12,304,554 | B2 * | 5/2025 | Anheier | B60N 2/14 |
| 2010/0297925 | A1 | 11/2010 | Burns | |
| 2012/0187723 | A1 | 7/2012 | Bergholtz | |
| 2014/0166233 | A1 * | 6/2014 | Wehrenberg | B60H 1/00535 |
| | | | | 165/42 |

FOREIGN PATENT DOCUMENTS

| | | | | |
|---|---|---|---|---|
| DE | 3619935 | A1 | | 12/1987 |
| DE | 19944530 | C1 | | 8/2000 |
| DE | 102012109321 | A1 | | 4/2014 |
| EP | 1642755 | A2 | | 4/2006 |
| EP | 2594463 | A1 | | 5/2013 |
| EP | 2752318 | A1 | | 7/2014 |
| FR | 2799718 | A1 | | 4/2001 |
| JP | H09240316 | A | | 9/1997 |
| JP | 2008260331 | A | | 10/2008 |
| JP | 2013028197 | A | * | 2/2013 |

* cited by examiner

CAB ASSEMBLY FOR FACILITATING INSTALLATION OF A STEERING COLUMN ON AN ORIGINAL PASSENGER SIDE OF A TRUCK CAB

CROSS-REFERENCE TO RELATED APPLICATION

The present disclosure is based on and claims priority to U.S. Provisional Patent Application No. 63/569,692 filed Mar. 25, 2024, the disclosure of which is incorporated herein by reference.

FIELD

The present disclosure relates to modifications to truck cabs that allow the driver and passenger sides of the truck cab to be reversed from their original positions.

BACKGROUND

The following U.S. Patents are incorporated herein by reference in entirety.

U.S. Pat. No. 5,863,093 discloses an opening provided through the front of a truck cab assembly during the manufacture process for allowing access to the interior of the truck cab for installing components therein. The opening most preferably substantially extends from sidewall to sidewall in the horizontal direction, and substantially from the roof structure to the floor structure in the vertical direction.

U.S. Pat. No. 5,857,726 discloses an instrument panel formed symmetrically with respect to a center of the panel. The instrument panel comprises a pair of recesses defined by left and right reinforcing/partition walls, and a pair of lower openings located under the recesses. A meter unit is mounted in the recess to oppose the driver seat. An under cover is mounted in the lower opening which is to oppose the driver seat. The under cover is formed with a hole through which a steering shaft is adapted to be passed. A tray is mounted in the recess which is to oppose the front passenger seat. A glove box is mounted in the lower opening which is to oppose the front passenger seat. The walls for defining the recesses of the instrument panel have a common fixing section usable for mounting any of the meter unit and the tray.

U.S. Pat. No. 6,260,914 discloses a dash reinforcement for a mobile vehicle with a passenger cab such as a sport utility vehicle, or medium or heavy-duty truck. The dash reinforcement may be a stamped sheet metal panel that strengthens the dash structure of the cab and provides for mounting of vehicle components. The dash reinforcement may be symmetrical about the centerline of the vehicle and this symmetry allows the panel to accommodate both left-hand drive and right-hand drive vehicle configurations. The dash reinforcement also includes 'Y' shaped passages for a driver control module and for accessory equipment such as heating, ventilation, and air conditioning (HVAC) modules.

U.S. Pat. No. 6,371,551 discloses an integrated front body clip including an instrument panel support structure, steering column support structure, and cowl structure forming a shared, dependent, and complementary support structure between the A-Pillars of a vehicle. Front and rear magnesium casting, each having a plurality of cast in features, are clamshelled into a single integrated clip. The resultant integrated front body clip offers substantial weight and improves the torsional and bending strength characteristics as compared with traditional steel structures.

U.S. Pat. No. 7,370,719 discloses an instrument panel construction including a main instrument panel unit which is formed with an open cross sectional shape, and which comprises a plate shaped upper surface member which extends substantially in the horizontal direction of the body of the vehicle across its transverse direction, and a front surface member which curves towards the passenger compartment of the vehicle from said upper surface member and extends downwards substantially in the vertical direction; and in that this main instrument panel unit is made as a single unit from magnesium alloy by a die casting process, and is fixed to left and right front pillars.

U.S. Pat. No. 10,457,333 discloses a right-hand drive conversion for a medium duty truck. The conversion process includes removal of dash assembly components and a sub-dash from the cab of a medium duty truck, such as a Freightliner M2. The conversion dash assembly includes a unitary dash and a plurality of brackets. The brackets are mounted to the left and right cab walls and the firewall.

U.S. Pat. No. 11,912,342 discloses an assembly for facilitating installation of a steering column on an original passenger's side of a truck cab having an aftermarket dash panel having a steering column opening configured to be located on the original passenger's side of the truck cab and an HVAC access opening configured to be located on an original driver's side of the truck cab. A first bracket has a forward portion for connection to original HVAC ductwork of the truck cab and has a rearward portion for connection to the aftermarket dash panel.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain examples, a cab assembly facilitating installation of a steering column on an original passenger side of a truck cab includes a dash assembly having a first section having a steering column opening configured to be located on the original passenger side of the truck cab and a second section configured to be located on an original driver side of the truck cab to cover a HVAC assembly, and a console bracket configured to support an original module of the truck cab thereon that is relocated from the original passenger side or the original driver side of the truck cab, the console bracket is positioned between a footwell on the original driver side of the truck cab and a footwell on the original passenger side of the truck cab.

In certain examples, a cab assembly facilitating installation of a steering column on an original passenger side of a truck cab includes a support structure configured to couple to a frame of the truck cab and extend from the original driver side and the original passenger side and a console bracket coupled to the support structure and configured to support an original module of the truck cab thereon that is relocated from the original passenger side or the original driver side of the truck cab, the console bracket is positioned between a footwell on the original driver side of the truck cab and a footwell on the original passenger side of the truck cab.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
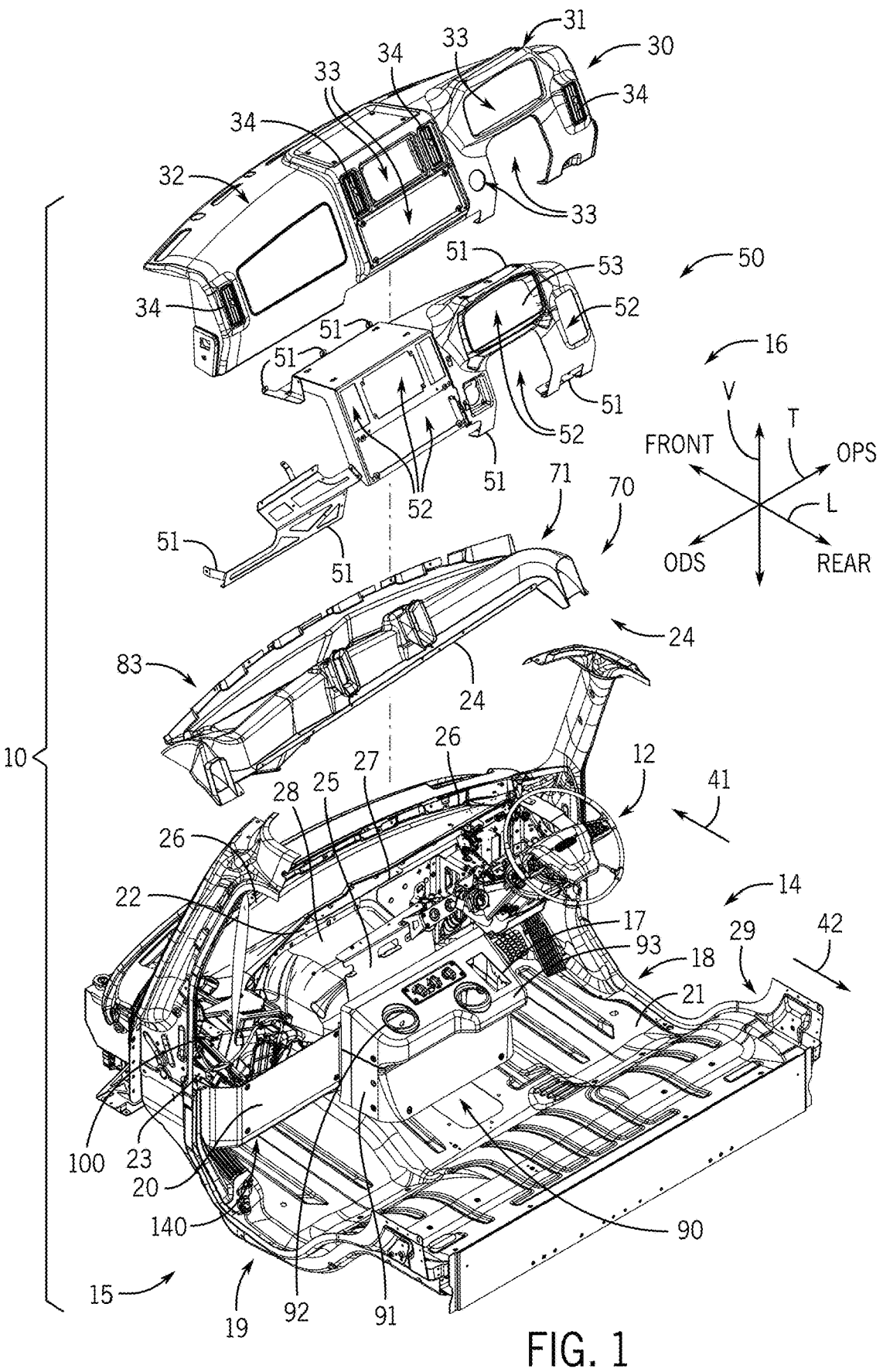
FIG. 1 is an exploded view of an example cab assembly according to the present disclosure.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "linked," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise limited or defined, discussion of particular directions is provided by example only, with regard to particular embodiments or relevant illustrations. For example, discussion of "top," "bottom," "front," "back," "left," "right," "lateral" or "longitudinal"

features is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally, use of the words "first," "second", "third," etc. is not intended to connote priority or importance, but merely to distinguish one of several similar elements from another.

In general, vehicles in the United States are left-hand drive, while vehicles in many non-U.S. countries are right-hand drive. For vehicles such as waste management trucks, street cleaners, postal trucks, and other municipal-type trucks, it is desirable to have the steering wheel on the opposite side of where it is normally located in a given country to allow the driver of the vehicle to be closer to the side of the road. However, it is logistically complicated and expensive to produce vehicles having opposite-side steering wheels (in comparison to a typical vehicle in that country) given the low demand for same. Therefore, it is desirable to be able to modify a vehicle that is mass-produced for a given country in the aftermarket by switching the steering wheel to the opposite side of where the manufacturer originally installed it. The present disclosure provides details of an assembly facilitating the installation of a steering column on an original passenger side of a truck cab and a method for moving a steering column of a truck cab from an original driver side of the truck cab to an original passenger side of the truck cab.

In the following description, the words "front," "forward," "foremost" and similar adjectives refer to the portions or components that are forwardly located with respect to the vehicle's forward direction of travel. The words "rear," "rearward," "rearmost", and similar adjectives refer to the opposite portions of those components, i.e., those that are rearward of the forward portions in the vehicle's forward direction of travel. "Left" and "right" refer to the left and right of the vehicle as experienced by a driver or passenger sitting therein and facing forward in the direction of forward travel. "Inner" refers to a surface of a component that cannot usually be seen while the component is installed, while "outer" refers to those portions that can be seen on the installed component. "Original" refers to the layout of the truck cab as designed and assembled by the vehicle manufacturer and to any components that were installed by the original vehicle manufacturer. "Original" may in some instances include components that were installed in the aftermarket as part of a prior modification to the vehicle, such as to repair or replace a broken or faulty component, but does not include aftermarket components that are installed as part of the modifications described herein below related to switching the driver and passenger sides of the vehicle. "Aftermarket" includes any components not installed by the original vehicle manufacturer.

FIG. 1 is an exploded view of an example cab assembly 10 for facilitating installation of a steering column 12 on an original passenger side 14 of a truck cab 16. Note that the steering column 12 is depicted as being installed on the original passenger side 14 of a truck cab 16, however, t the steering column 12 was originally installed on the original driver side 15 of the truck cab 16 when the truck cab 16 was manufactured by the original equipment manufacturer (OEM). As will be described in greater detail hereinbelow, the cab assembly 10 includes one or more components such as a dash assembly 30, a bracket dash support 50, a duct assembly 70, and a center console assembly 90 can be installed in the truck cab 16. These components and other components and/or features are described herein below. The truck cab 16 extends longitudinally (see example longitudinal axis L) between a front end 41 and a rear end 42 and laterally (scc example lateral axis T) extends between the original passenger side 14 (OPS) and the original driver side 15 (ODS). Note that the example longitudinal axis L is perpendicular to the example lateral axis T. The truck cab 16 also extends vertically between a top and a bottom (see example vertical axis V, which is perpendicular to the example lateral axis T and the example longitudinal axis L).

The truck cab 16 includes a frame 17 to which the cab assembly 10 is coupled. The frame 17 at least partially defines footwells 18, 19 and a seating area 29 of the truck cab 16. As the truck cab 16 was originally manufactured, several components were located near the passenger side footwell 18 and covered by a kick panel. In order to install the steering column 12 on the original passenger side 14 of the truck cab 16, the present inventors relocated several components that were originally installed near the original passenger side 14 to different locations in the truck cab 16. For example, the HVAC assembly 100 that was originally located on the original passenger side 14 behind a kick panel is relocated to the original driver side 15 (as depicted in FIG. 1) behind a kick panel 20 that is adjacent to the original driver side footwell 19.

Figure 3:
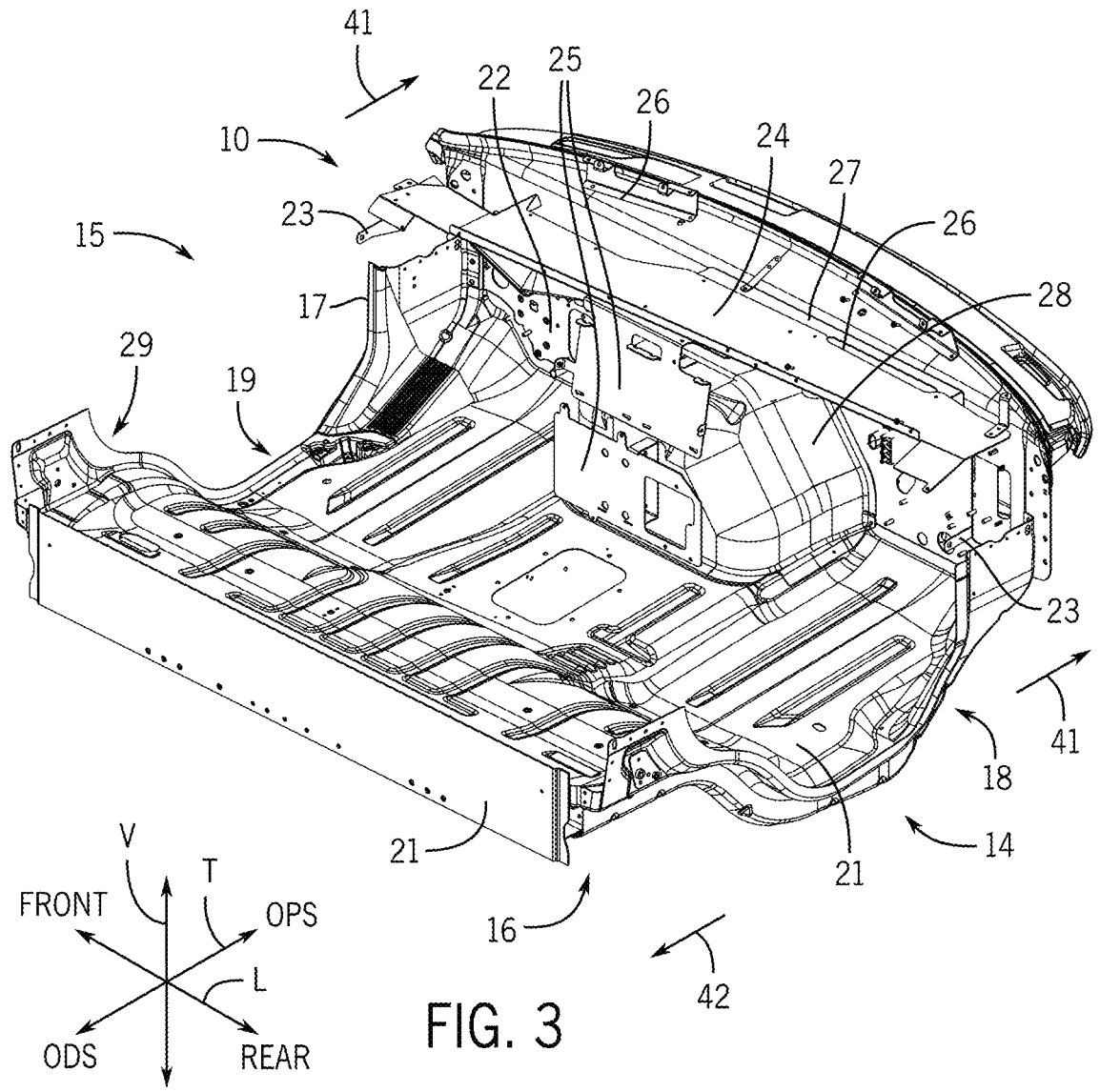

Referring to FIG. 3, a firewall 22 includes a sloped firewall surface 28 (this portion of the firewall 22 is commonly called the 'doghouse') that at least partially defines a 'wedge' shaped space that accommodated an angled portion 102 (FIGS. 6, 7) of the HVAC assembly 100 in its original installation position on the original passenger side 14. When relocating the HVAC assembly 100 from the original passenger side 14 to the original driver side 15, the HVAC assembly 100 is rotated or tilted along its longitudinal axis such that the upper surface of the HVAC assembly 100 is angled downwardly in a direction from the original driver side 15 to the original passenger side 14. The 'tilt' of the HVAC assembly 100 is required when relocating the HVAC assembly 100 because the frame 17 and the driver side sidewall of the frame 17 do not provide a corresponding space to receive the angled portion 102 of the relocated HVAC assembly 100.

In addition, several original electrical modules, such as a fuse box module 201 or modules 202 with other electronic components (see FIG. 7) (e.g., advanced anti-collision system modules, XMC module, iSAM® modules) removed from their original positions either on the original passenger side 14 or the original driver side 15 and thereafter mounted to one or more console brackets 25 in the center console assembly 90 under a cover 91. The center console assembly 90 is positioned between the footwells 18, 19 and vertically below the dash assembly 30. The cover 91 defines a space (not depicted) therein in which components (e.g., fuse box modules, electronic modules, wires, vents, original electrical modules 201, 202) are located and/or routed. The cover 91 includes one or more cup holders 92 and one or more openings 93 in which vents are positioned for directing air from the HVAC assembly 100 toward the operator and/or passenger. The center console assembly 90 also includes one or more console brackets 25 (see example console brackets 25 in FIGS. 2-3) supporting the center console assembly 90 and for supporting one or more original electrical modules 201, 202.

Figure 2:
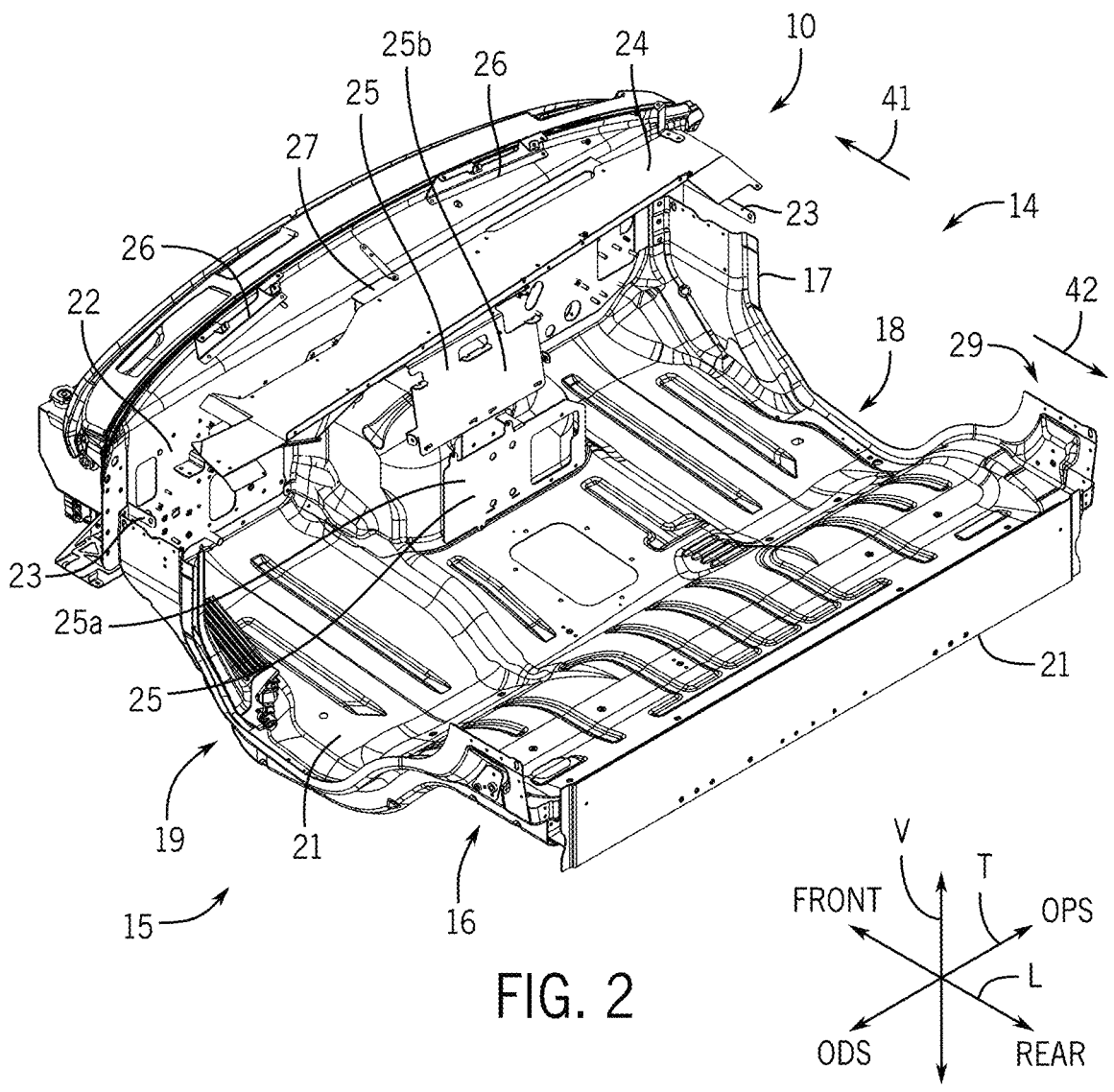
FIGS. 2-3 are perspective views of a partial cab assembly according to the present disclosure.

FIGS. 2-3 depict the frame 17 of the truck cab 16 in greater detail. The firewall 22 is provided to separate the engine components (not depicted) of the truck cab 16 from the interior space and the occupants. A floor structure 21 is coupled to the firewall 22 and at least partially defines the footwells 18, 19 and the seating area 29 of the truck cab 16.

The cab assembly 10 includes cab brackets 23 coupled to the frame 17 at the original passenger side 14 and at the original driver side 15, respectively. A center support structure 24 laterally extends between the sides 14, 15 and is coupled to the cab brackets 23. The support structure 24 includes a plurality of holes, mounting structures, bosses, flanges, lips, and/or the like for coupling and supporting various components thereon. One or more center console brackets 25 are coupled to the support structure 24, the firewall 22, and/or the frame 17. In certain examples, the console brackets 25 permit various consoles, wires, wiring harnesses, and/or the like to be coupled thereto. One or more front brackets 26 are coupled to the frame 17 near the front of the truck cab 16 (e.g., the front brackets 26 are coupled near the windshield), and a firewall bracket 27 is coupled to the firewall 22. Cab brackets 23 are also coupled to the support structure 24 and the frame 17. In certain examples, a first console bracket 25a (see FIG. 2) is longitudinally offset in a direction toward a front end 41 of the truck cab 16 from a second console bracket 25b (see FIG. 2) toward the rear of the truck cab 16. In certain examples the second console bracket 25b is located vertically above the first console bracket 25a.

Referring back to FIG. 1, the bracket dash support 50 has one or more flanges 51 which couple to one or more of the cab brackets 23, the support structure 24, the console bracket 25, the firewall bracket 27, and/or the front brackets 26 (FIG. 2) and is for supporting the dash assembly 30 thereon. For example, the bracket dash support 50 includes opposing flanges 51 which are configured to couple to the cab brackets 23. The bracket dash support 50 defines a plurality of openings 52 in which different components of the cab assembly 10 and/or the truck cab 16 are positioned. Transparent plastic or glass panels 53 may cover one or more openings 52. Note that the panels 53 can be part of or from the instrument panel from the original manufacturer (e.g., transparent panel that covers a LED screen).

The dash assembly 30 is supported by the bracket dash support 50, and in one non-limiting example, the dash assembly 30 is coupled to the bracket dash support 50 with a plurality of bosses (not depicted) on the bracket dash support 50. In certain examples, the dash assembly 30 includes a first section 31 located near the original passenger side 14 and a second section 32 which extends laterally from the first section 31 to the original driver side 15. The dash assembly 30 defines a plurality of openings 33 in which different components of the cab assembly 10 and/or the truck cab 16 are positioned. In certain examples, one or more of the openings 33 align with the openings 52 in the bracket dash support 50, such as a steering column opening through which the steering column 12 extends and/or an HVAC access opening 140 (FIG. 1) through which the HVAC assembly 100 can be accessed. The dash assembly 30 can also include one or more vents or covers 34.

Figure 4:
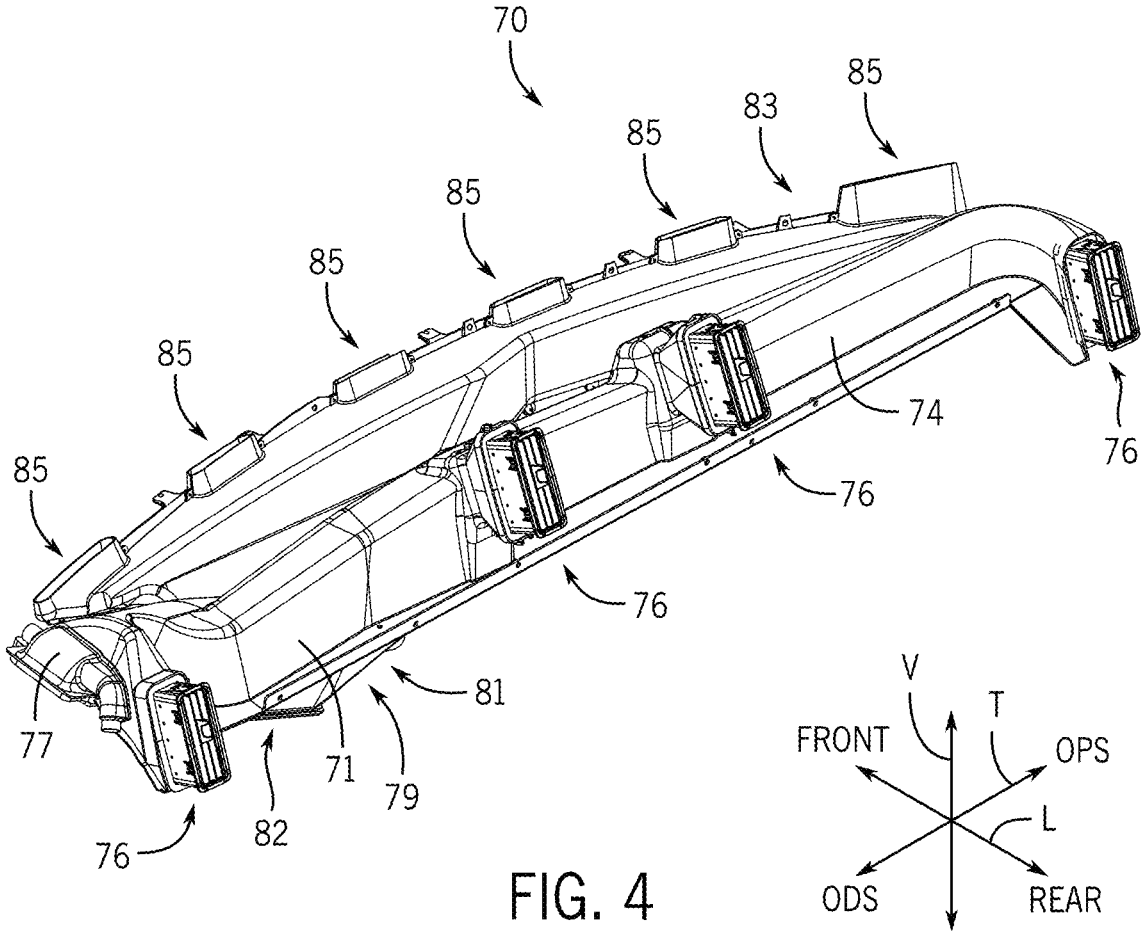
FIG. 4 is a perspective view of an example duct assembly according to the present disclosure.
Figure 5:
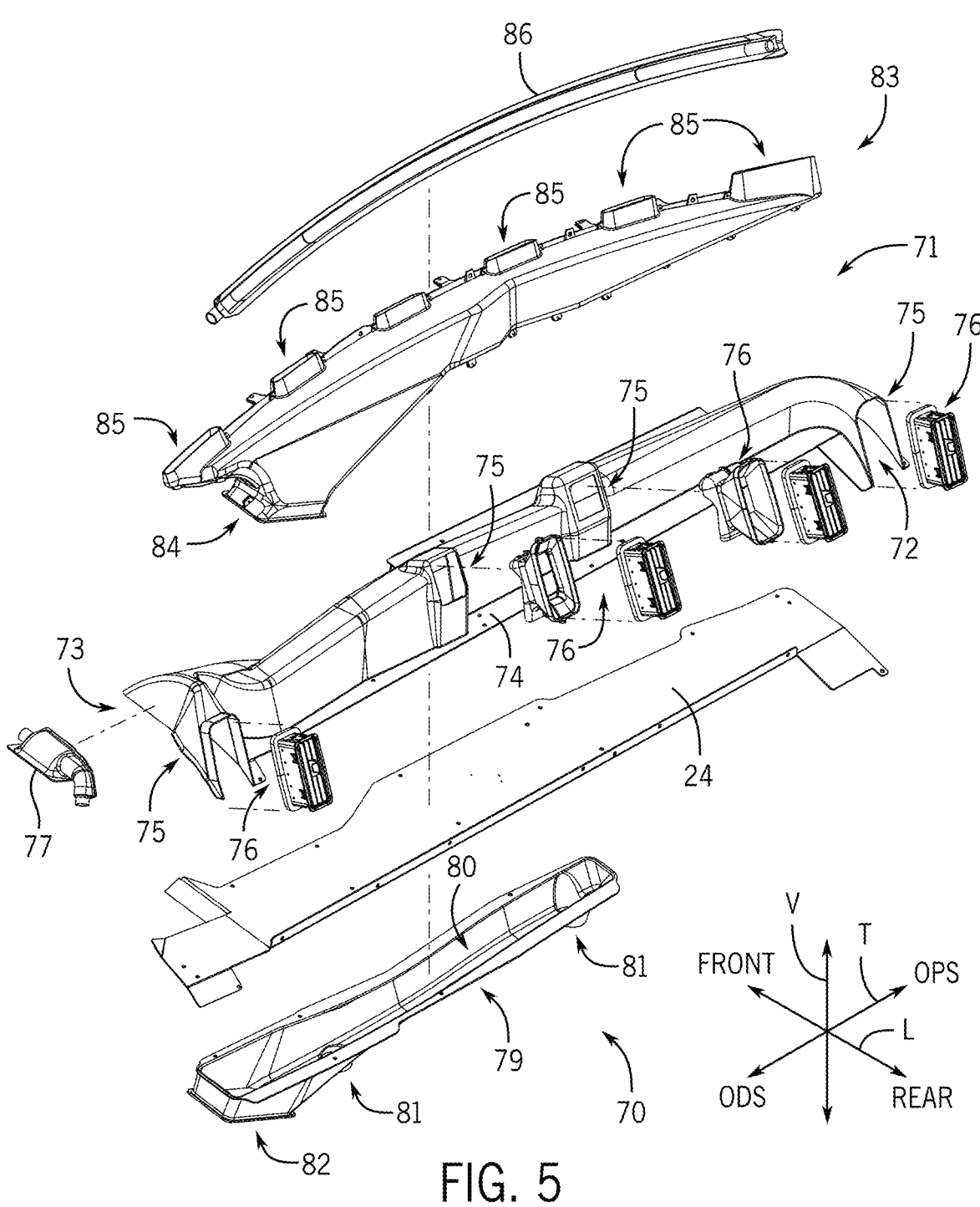
FIG. 5 is an exploded view of the duct assembly of FIG. 4.

Referring now FIGS. 4-5, the duct assembly 70 is depicted in greater detail. Note that the support structure 24 is indicated in dashed lines in FIG. 5. The duct assembly 70 includes a main face duct 71, which when coupled to the support structure 24, defines a channel 72 through which air from the HVAC assembly 100 (FIG. 1) is conveyed (e.g., by a fan of the HVAC assembly 100). The main face duct 71 includes one or more inlets 73 which are coupled to one or more outlets 101 (FIG. 6) of the HVAC assembly 100. The main face duct 71 has a sidewall 74 with a plurality of cutouts 75 defined therein. A plurality of vents 76 cover the cutouts 75 and extend away from the sidewall 74.

The duct assembly 70 includes a first door manifold 77 for routing air from the HVAC assembly 100 to ducts and/or vents on the doors (not depicted) of the truck cab 16 or sidewall panels (not depicted) on the frame 17 on the original driver side 15.

The duct assembly 70 includes a foot duct 79 configured to direct air from the HVAC assembly 100 to the footwells 18, 19. The foot duct 79 is coupled to the underside of the support structure 24, and a channel 80 is defined by the foot duct 79 and the support structure 24 through which air from the HVAC assembly 100 is conveyed (e.g., by a fan of the HVAC assembly 100). The foot duct 79 includes one or more inlets 82 which are coupled to one or more outlets 101 (FIG. 6) of the HVAC assembly 100. The foot duct 79 also includes one or more outlets 81 through which the air is dispensed from the foot duct 79.

The duct assembly 70 includes a defrost duct 83 configured to direct air from the HVAC assembly 100 toward the windshield. The defrost duct 83 is coupled to the frame 17 and/or the front brackets 26. The defrost duct 83 has an inlet 84 which is coupled to one or more outlets 101 (FIG. 6) of the HVAC assembly 100. The defrost duct 83 defines a channel (not depicted) through which air from the HVAC assembly 100 is conveyed (e.g., by a fan of the HVAC assembly 100). One or more outlets 85 are provided and the air is dispensed via the outlets 85 toward the windshield.

A second door manifold 86 is provided for routing air from the HVAC assembly 100 to ducts and/or vents on the doors (not depicted) of the truck cab 16 or sidewall panels (not depicted) on the frame 17 on the original passenger side 14. The second door manifold 86 is positioned relative to the defrost duct 83 such that a channel (not depicted) through which air is conveyed is defined between the second door manifold 86 and the surface of the defrost duct 83 facing the second door manifold 86.

Figure 6:
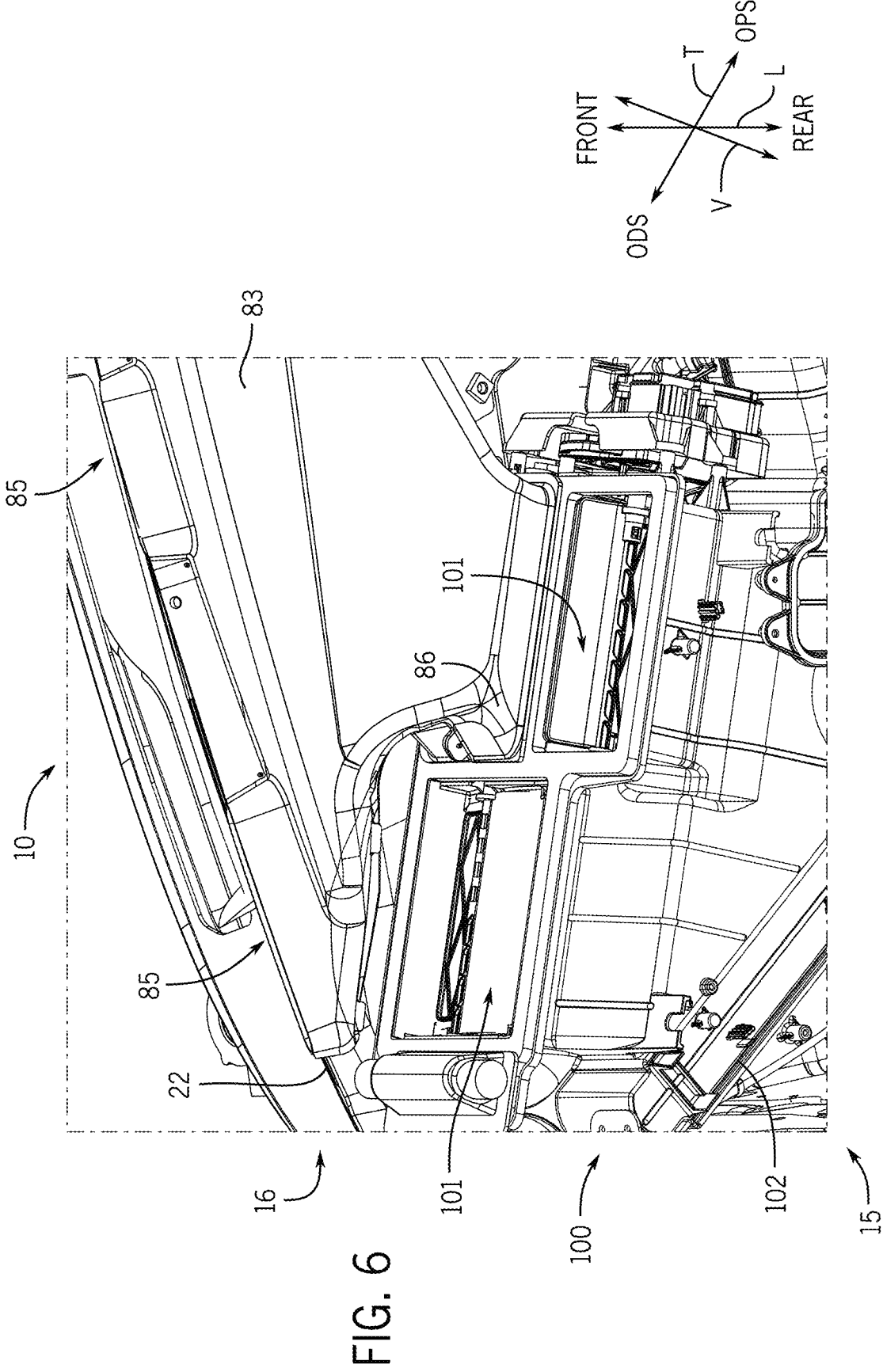
FIG. 6 is a perspective view of an example duct assembly according to the present disclosure coupled to an example HVAC assembly.

Referring to FIG. 6, an example HVAC assembly 100 is depicted having one or more outlets 101. For illustrative purposes, the inlet 84 of the defrost duct 83 (see also FIG. 5) is coupled to one of outlets 101. The remaining outlets 101 are coupled to the inlet 73 of the main face duct 71 and/or to the inlet 82 of the foot duct 79. Note that the HVAC assembly 100 is angled upwardly in a direction from the original passenger side 14 (lower corner) to the original driver side 15 (higher corners).

Figure 7:
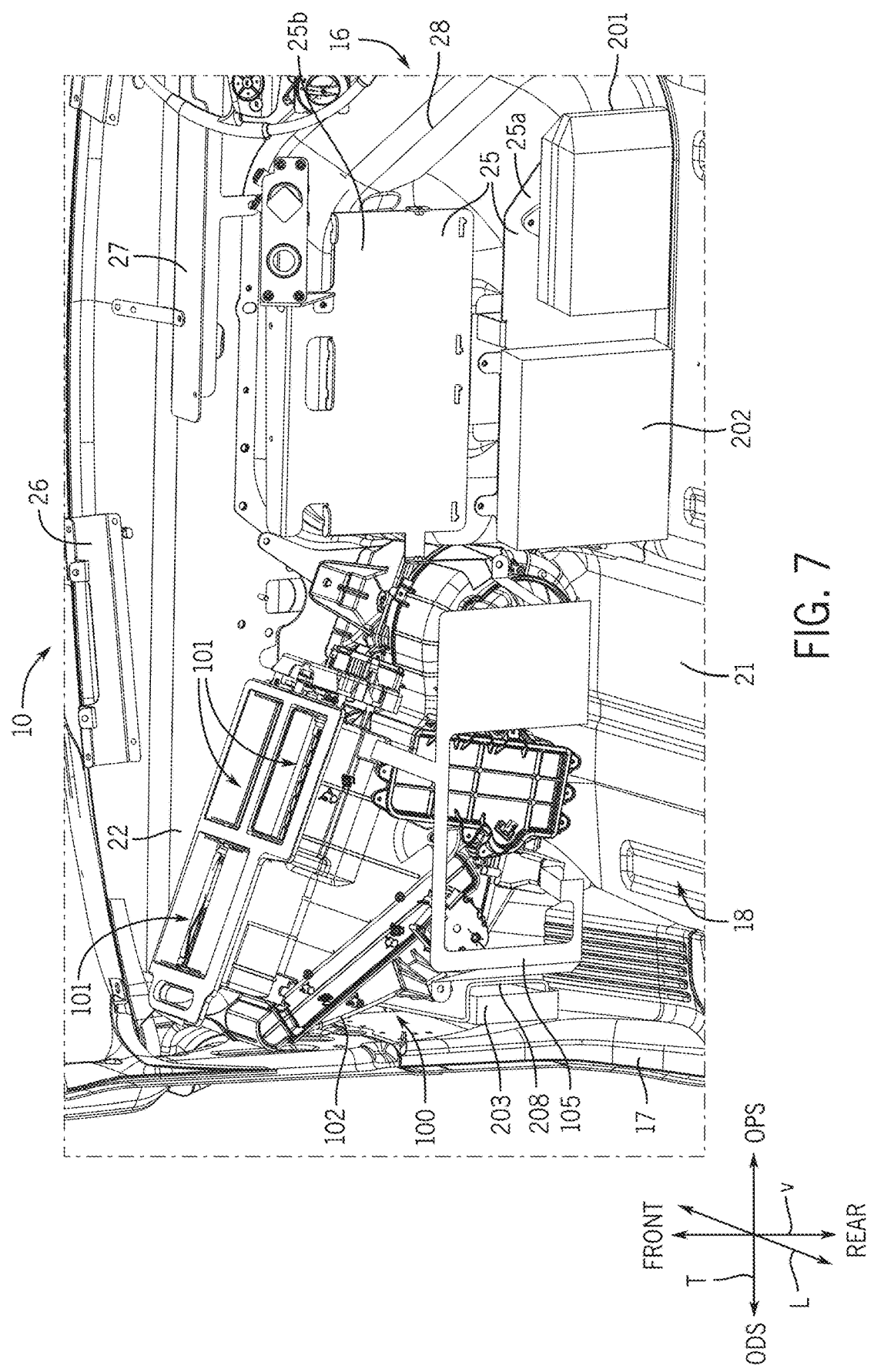
FIG. 7 is a perspective view of an example cab assembly and an example HVAC assembly according to the present disclosure an original driver side of a truck cab.

FIG. 7 depicts the console brackets 25a, 25b with the fuse box module 201 and an electrical module 202 coupled thereto. An HVAC bracket 105 is coupled to the HVAC assembly 100 and is configured to protect the HVAC assembly 100 and permit the kick panel 20 (FIG. 1) to be coupled thereto. The HVAC bracket 105 has a cutout 106 through which a filter of the HVAC assembly 100 can be accessed. The HVAC bracket 105 also allows for other modules and/or original manufacturer brackets to be coupled thereto.

The HVAC bracket 150 also includes a support arm 107 and an auxiliary bracket 208 coupled thereto. The support arm 107 supports and holds the auxiliary bracket 208. The auxiliary bracket 208 is configured to support another original electrical module 203 (e.g., a third original module 203) to be supported thereby. In the example depicted in FIG. 7, the auxiliary bracket 208 is located between the frame 17 of the truck cab 16 on the original driver side 15 and the HVAC assembly 100. As such, the modules 203 supported by the auxiliary bracket 208 is also located between the frame 17 of the truck cab 16 on the original driver side 15 and the HVAC assembly 100.

Figure 8:
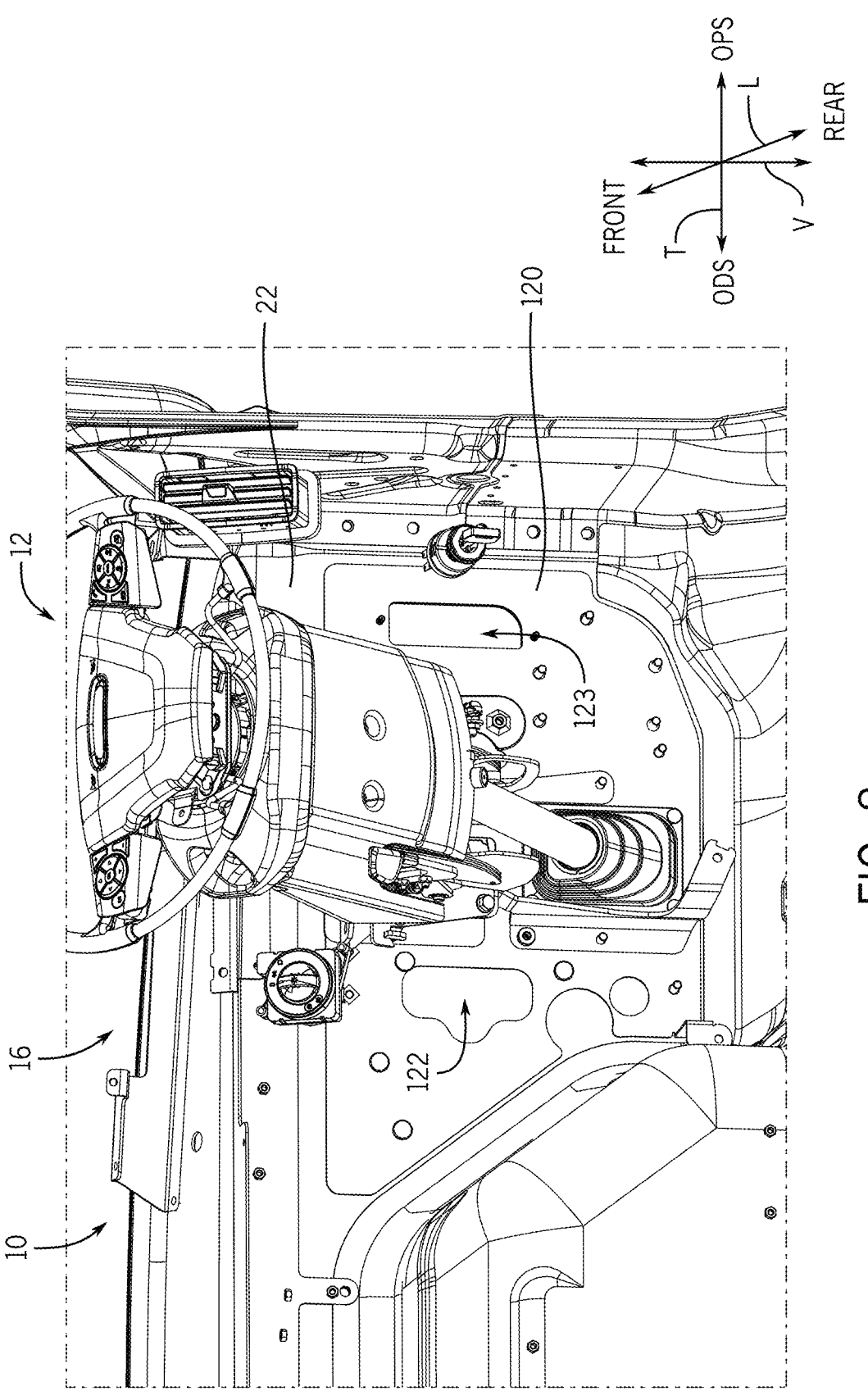
FIG. 8 is a perspective view of an example steering column and an example cab assembly according to the present disclosure at an original passenger side of a truck cab.

FIG. 8 depicts a first supplemental firewall plate 120 which is coupled to the firewall 22. The first supplemental firewall plate 120 facilitates coupling of the steering column 12 and pedals (e.g., throttle pedal, brake pedal; not depicted) to the firewall 22 on the original passenger side 14. The first supplemental firewall plate 120 also includes a first cutout 123 through which an air manifold (not depicted) extends and a second cutout 124 through which the power distribution unit (PDU) extends. The first supplemental firewall plate 120 also advantageously covers cutouts in the firewall 22 that were utilized when the truck cab 16 was in its original configuration (e.g., with the steering column on the original driver side 15 and HVAC unit on the original passenger side 14). The supplemental firewall plate 120 permits kick covers (not depicted) to be attached thereto. Note that in certain examples, another supplemental firewall plate (not depicted) is located on the engine side of the firewall 22 such that the another supplemental firewall plate and the first supplemental firewall plate 120 sandwich the firewall 22.

Figure 9:
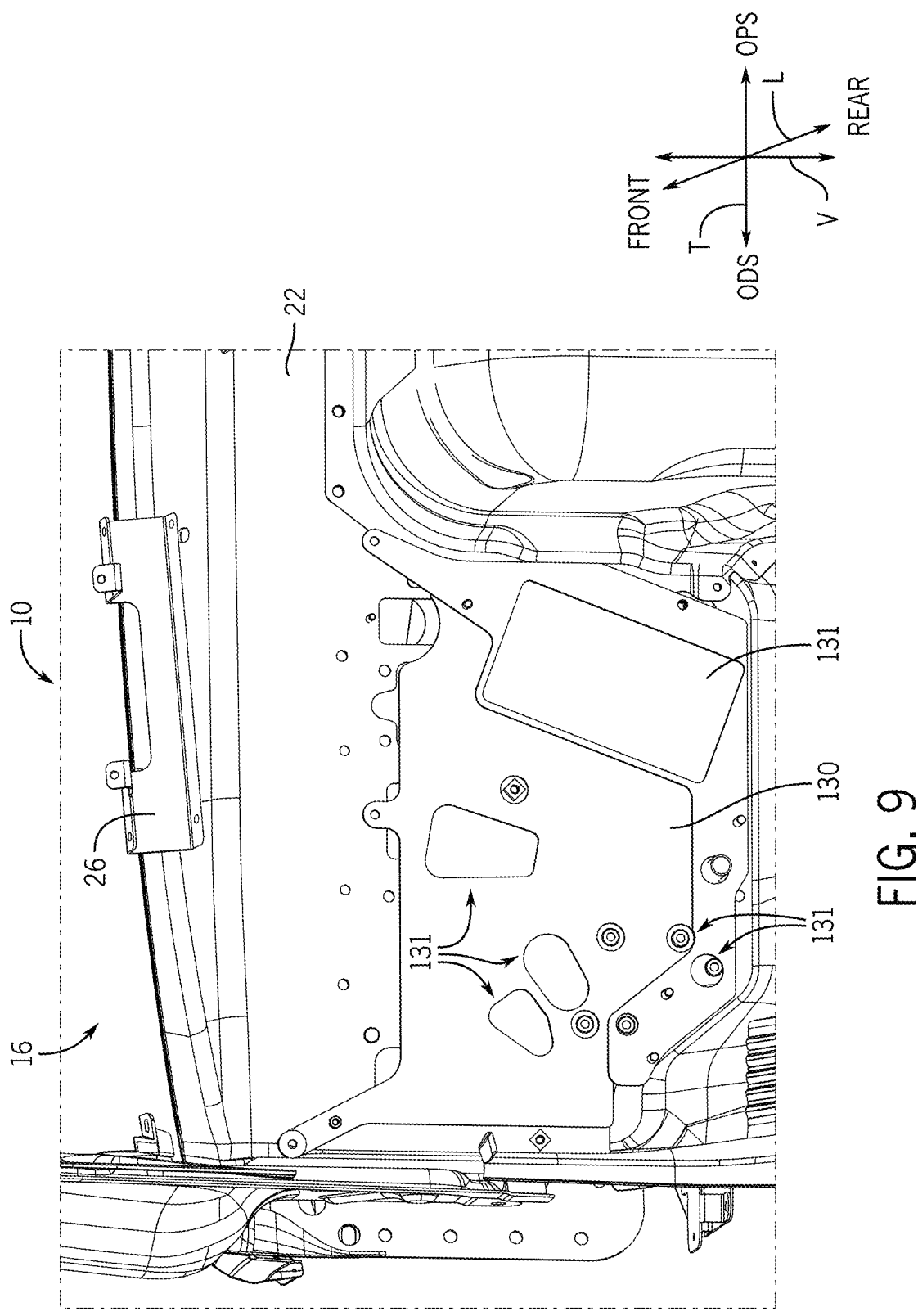
FIG. 9 is a perspective view of an example cab assembly according to the present disclosure at an original driver side of the truck cab.

A second supplemental firewall plate 130 (FIG. 9) is coupled to the firewall 22 at the original driver side 15. The second supplemental firewall plate 130 advantageously covers cutouts in the firewall 22 that were utilized when the truck cab 16 was in its original configuration and facilitates mounting of the HVAC assembly 100 on the original driver side 15. The second supplemental firewall plate 130 can include one or more cutouts 131 through which lines (e.g., heater lines) extend, components of the truck cab 16 and/or HVAC assembly 100 extend, and/or fresh air is passed. Note that in certain examples, a backing plate 135 (FIG. 10) is located on the engine side of the firewall 22 such that the backing plate 135 and the second supplemental firewall plate 130 sandwich the firewall 22. In certain examples, an air intake 136 and a coolant tank 137 are coupled to and vertically supported by the backing plate 135.

One or more engine side brackets 139 (FIG. 10) are coupled to the firewall 22 and/or the backing plates (e.g., backing plate 135). The engine side bracket 139 is configured to hold external fuse boxes, engine air intake components, and/or other modules located on the engine side of the firewall 22.

Figure 10:
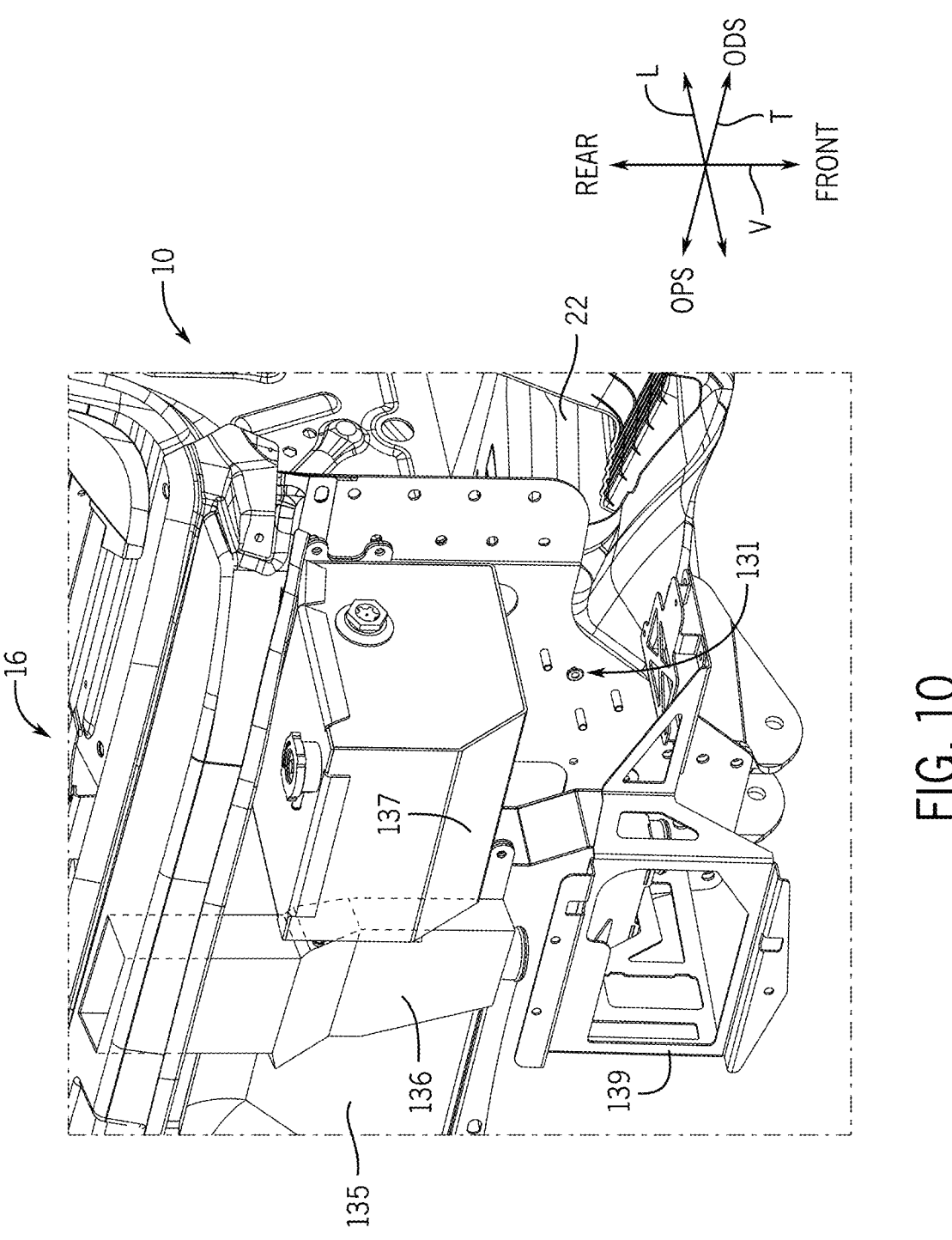
FIG. 10 is a perspective view of an example cab assembly according to the present disclosure at the original driver side of the truck cab viewed from a front engine side of the truck cab.
Figure 11:
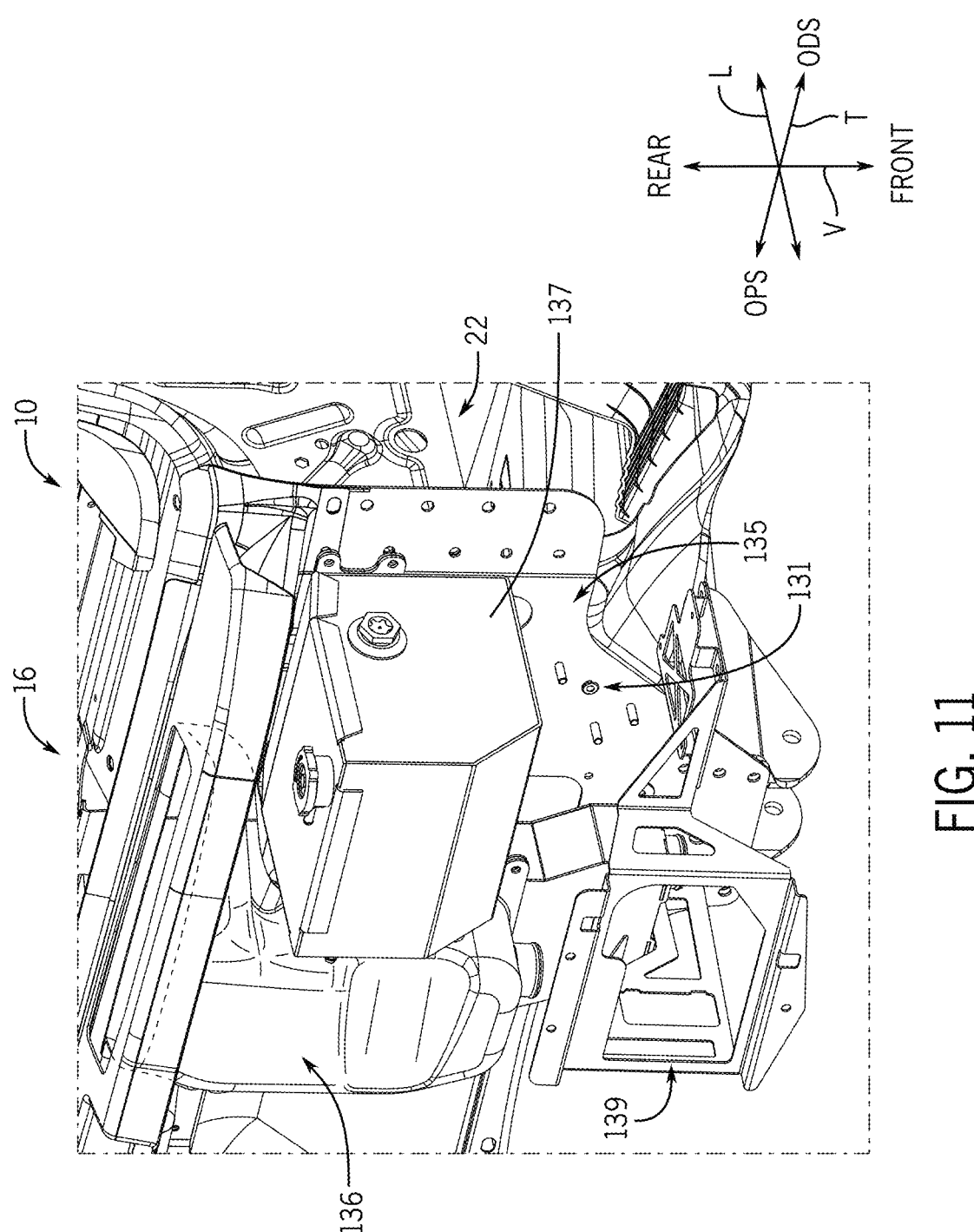
FIG. 11 is a perspective view of an example cab assembly according to the present disclosure along the original driver side of the truck cab viewed from a front engine side of the truck cab.

FIG. 11 is another example cab assembly 10 similar to the cab assembly 10 depicted in FIG. 10, with like parts labeled with like reference numbers. In this example, the size and shape of the air intake 136 is different than the size and/or shape of the example air intake 136 depicted in FIG. 10.

In certain examples, a cab assembly facilitating installation of a steering column on an original passenger side of a truck cab includes a dash assembly having a first section having a steering column opening configured to be located on the original passenger side of the truck cab and a second section configured to be located on an original driver side of the truck cab to cover a HVAC assembly, and a console bracket configured to support an original module of the truck cab thereon that is relocated from the original passenger side or the original driver side of the truck cab, the console bracket is positioned between a footwell on the original driver side of the truck cab and a footwell on the original passenger side of the truck cab.

Optionally, the console bracket is configured to be coupled to a firewall of the truck cab. Optionally, a support structure is configured to couple to a frame of the truck cab and extend from the original driver side and the original passenger side and the console bracket is coupled to the support structure between the original driver side and the original passenger side. Optionally, a first cab bracket configured to be coupled to the frame on the original driver side of the truck cab and a second cab bracket on the original passenger side of the truck cab and the support structure is coupled to and extends between the first cab bracket and the second cab bracket. Optionally, the console bracket is a first console bracket and the original module is a first original module and a second console bracket configured to support a second original module of the truck cab, the second console bracket is positioned between the footwell on the original driver side of the truck cab and the footwell on the original passenger side of the truck cab. Optionally, the second console bracket is located vertically above the first console bracket. Optionally, the second console bracket is located longitudinally offset from the first console bracket in a direction toward a front end of the truck cab. Optionally, the first console bracket is coupled to the second console bracket and the second console bracket is configured to be coupled to a firewall of the truck cab. Optionally, a support structure is configured to couple to a frame of the truck cab and extend from the original driver side and the original passenger side and the first console bracket is coupled to the second console bracket and the second console bracket is coupled to the support structure between the original driver side and the original passenger side. Optionally, a cover is located between the footwell on the original driver side of the truck cab and the footwell on the original passenger side of the truck cab and being configured to cover the console bracket and the original module. Optionally, an HVAC bracket is configured to be coupled to the HVAC assembly a kick panel coupled to the HVAC bracket and configured to protect the HVAC assembly. Optionally, an HVAC bracket is configured to be coupled to the HVAC assembly, the HVAC bracket having an auxiliary bracket that is configured to support another original module of the truck cab thereon that is relocated from the original passenger side or the original driver side of the truck cab. Optionally, the auxiliary bracket is configured to be located between the HVAC assembly and a frame of the truck cab. Optionally, a duct assembly configured to coupled to the HVAC assembly and distribute conditioned air from the HVAC assembly and a support structure coupled and supporting the duct assembly, the support structure is configured to be coupled to a frame of the truck cab and extend from the original driver side and the original passenger side.

In certain examples, a cab assembly facilitating installation of a steering column on an original passenger side of a truck cab includes a support structure configured to couple to a frame of the truck cab and extend from the original driver side and the original passenger side and a console bracket coupled to the support structure and configured to support an original module of the truck cab thereon that is relocated from the original passenger side or the original driver side of the truck cab, the console bracket is positioned between a footwell on the original driver side of the truck cab and a footwell on the original passenger side of the truck cab.

Optionally, a first cab bracket is configured to be coupled to the frame on the original driver side of the truck cab and a second cab bracket on the original passenger side of the truck cab and the support structure is coupled to and extends between the first cab bracket and the second cab bracket. Optionally, the console bracket is a first console bracket and the original module is a first original module and a second console bracket configured to support a second original module of the truck cab, the second console bracket is positioned between the footwell on the original driver side of the truck cab and the footwell on the original passenger side of the truck cab. Optionally, the second console bracket is located vertically above the first console bracket. Optionally, the second console bracket is located longitudinally offset from the first console bracket in a direction toward a front end of the truck cab. Optionally, the first console bracket is coupled to the second console bracket and the second console bracket is coupled to the support structure between the original driver side and the original passenger side. Optionally, an HVAC bracket is configured to be coupled to a HVAC assembly of the truck cab, the HVAC bracket including an auxiliary bracket configured to support another original module of the truck cab thereon that is relocated from the original passenger side or the original driver side of the truck cab.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives, and modifications are possible within the scope of the appended claims.

This written description uses examples to disclose the invention and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A cab assembly facilitating installation of a steering column on an original passenger side of a truck cab, the cab assembly comprising:
   a dash assembly having;
      a first section having a steering column opening configured to be located on the original passenger side of the truck cab; and
      a second section configured to be located on an original driver side of the truck cab to cover a HVAC assembly; and
   a console bracket configured to support an original module of the truck cab thereon that is relocated from the original passenger side or the original driver side of the truck cab, the console bracket is positioned between a footwell on the original driver side of the truck cab and a footwell on the original passenger side of the truck cab.

2. The cab assembly according to claim 1, wherein the console bracket is configured to be coupled to a firewall of the truck cab.

3. The cab assembly according to claim 1, further comprising a support structure configured to couple to a frame of the truck cab and extend from the original driver side and the original passenger side; and wherein the console bracket is coupled to the support structure between the original driver side and the original passenger side.

4. The cab assembly according to claim 3, further comprising a first cab bracket configured to be coupled to the frame on the original driver side of the truck cab and a second cab bracket on the original passenger side of the truck cab; and wherein the support structure is coupled to and extends between the first cab bracket and the second cab bracket.

5. The cab assembly according to claim 1, wherein the console bracket is a first console bracket and the original module is a first original module, and further comprising:

a second console bracket configured to support a second original module of the truck cab, the second console bracket is positioned between the footwell on the original driver side of the truck cab and the footwell on the original passenger side of the truck cab.

6. The cab assembly according to claim 5, wherein the second console bracket is located vertically above the first console bracket.

7. The cab assembly according to claim 5, wherein the second console bracket is located longitudinally offset from the first console bracket in a direction toward a front end of the truck cab.

8. The cab assembly according to claim 5, wherein the first console bracket is coupled to the second console bracket and the second console bracket is configured to be coupled to a firewall of the truck cab.

9. The cab assembly according to claim 5, further comprising a support structure configured to couple to a frame of the truck cab and extend from the original driver side and the original passenger side; and wherein the first console bracket is coupled to the second console bracket and the second console bracket is coupled to the support structure between the original driver side and the original passenger side.

10. The cab assembly according to claim 1, further comprising a cover located between the footwell on the original driver side of the truck cab and the footwell on the original passenger side of the truck cab and being configured to cover the console bracket and the original module.

11. The cab assembly according to claim 1, further comprising an HVAC bracket configured to be coupled to the HVAC assembly; and a kick panel coupled to the HVAC bracket and configured to protect the HVAC assembly.

12. The cab assembly according to claim 1, further comprising an HVAC bracket configured to be coupled to the HVAC assembly, the HVAC bracket having an auxiliary bracket that is configured to support another original module of the truck cab thereon that is relocated from the original passenger side or the original driver side of the truck cab.

13. The cab assembly according to claim 12, wherein the auxiliary bracket is configured to be located between the HVAC assembly and a frame of the truck cab.

14. The cab assembly according to claim 1, further comprising:

a duct assembly configured to coupled to the HVAC assembly and distribute conditioned air from the HVAC assembly; and a support structure coupled and supporting the duct assembly, the support structure is configured to be coupled to a frame of the truck cab and extend from the original driver side and the original passenger side.

15. A cab assembly facilitating installation of a steering column on an original passenger side of a truck cab, the cab assembly comprising:

a support structure configured to couple to a frame of the truck cab and extend from an original driver side and the original passenger side above a footwell on the original driver side of the truck cab and a footwell on the original passenger side of the truck cab; and a console bracket coupled to the support structure and configured to support an original module of the truck cab thereon that is relocated from the original passenger side or the original driver side of the truck cab, the console bracket is positioned between the footwell on the original driver side of the truck cab and the footwell on the original passenger side of the truck cab.

16. A cab assembly facilitating installation of a steering column on an original passenger side of a truck cab, the cab assembly comprising:

a support structure configured to couple to a frame of the truck cab and extend from an original driver side and the original passenger side;

a console bracket coupled to the support structure and configured to support an original module of the truck cab thereon that is relocated from the original passenger side or the original driver side of the truck cab, the console bracket is positioned between a footwell on the original driver side of the truck cab and a footwell on the original passenger side of the truck cab; and a first cab bracket configured to be coupled to the frame on the original driver side of the truck cab and a second cab bracket on the original passenger side of the truck cab; and wherein the support structure is coupled to and extends between the first cab bracket and the second cab bracket.

17. A cab assembly facilitating installation of a steering column on an original passenger side of a truck cab, the cab assembly comprising:

a support structure configured to couple to a frame of the truck cab and extend from an original driver side and the original passenger side; and a first console bracket coupled to the support structure and configured to support a first original module of the truck cab thereon that is relocated from the original passenger side or the original driver side of the truck cab, the first console bracket is positioned between a footwell on the original driver side of the truck cab and a footwell on the original passenger side of the truck cab; and a second console bracket configured to support a second original module of the truck cab, the second console bracket is positioned between the footwell on the original driver side of the truck cab and the footwell on the original passenger side of the truck cab.

18. The cab assembly according to claim 17, wherein the second console bracket is located vertically above the first console bracket.

19. The cab assembly according to claim 17, wherein the second console bracket is located longitudinally offset from the first console bracket in a direction toward a front end of the truck cab.

20. The cab assembly according to claim 17, wherein the first console bracket is coupled to the second console bracket and the second console bracket is coupled to the support structure between the original driver side and the original passenger side.

21. A cab assembly facilitating installation of a steering column on an original passenger side of a truck cab, the cab assembly comprising:

a support structure configured to couple to a frame of the truck cab and extend from an original driver side and the original passenger side;

a console bracket coupled to the support structure and configured to support an original module of the truck cab thereon that is relocated from the original passenger side or the original driver side of the truck cab, the console bracket is positioned between a footwell on the original driver side of the truck cab and a footwell on the original passenger side of the truck cab; and an HVAC bracket configured to be coupled to a HVAC assembly of the truck cab, the HVAC bracket includes an auxiliary bracket configured to support another original module of the truck cab thereon that is relocated from the original passenger side or the original driver side of the truck cab.

* * * * *